(12) United States Patent
Rezaiifar et al.

(10) Patent No.: US 8,755,407 B2
(45) Date of Patent: Jun. 17, 2014

(54) RADIO LINK PROTOCOLS FOR ENHANCING EFFICIENCY OF MULTI-LINK COMMUNICATION SYSTEMS

(75) Inventors: Ramin Rezaiifar, San Diego, CA (US);
Parag A. Agashe, San Diego, CA (US);
Paul E. Bender, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 819 days.

(21) Appl. No.: 11/355,700

(22) Filed: Feb. 15, 2006

(65) Prior Publication Data

US 2006/0187955 A1  Aug. 24, 2006

Related U.S. Application Data

(60) Provisional application No. 60/654,605, filed on Feb. 18, 2005, provisional application No. 60/659,642, filed on Mar. 7, 2005, provisional application No. 60/715,730, filed on Sep. 8, 2005.

(51) Int. Cl.
*H04J 3/24* (2006.01)

(52) U.S. Cl.
USPC .......................... 370/474; 455/403; 455/422.1

(58) Field of Classification Search
USPC .................. 370/464, 474; 455/3, 422.1, 436
See application file for complete search history.

(56) References Cited

U.S. PATENT DOCUMENTS

| | | | |
|---|---|---|---|
| 4,703,475 A | 10/1987 | Dretzka et al. | |
| 6,381,215 B1 * | 4/2002 | Hamilton et al. | 370/236 |
| 6,611,521 B1 | 8/2003 | McKay et al. | |
| 6,629,285 B1 * | 9/2003 | Gerendai et al. | 714/748 |
| 6,678,523 B1 * | 1/2004 | Ghosh et al. | 455/442 |
| 6,711,180 B1 * | 3/2004 | Delesalle et al. | 370/474 |
| 7,000,021 B1 * | 2/2006 | Radhakrishnan et al. | 709/230 |
| 7,099,298 B2 | 8/2006 | Kim | |
| 7,406,082 B2 * | 7/2008 | Nagarajan et al. | 370/394 |
| 7,542,472 B1 * | 6/2009 | Gerendai et al. | 370/394 |
| 2001/0005377 A1 * | 6/2001 | Edgar et al. | 370/445 |
| 2001/0032325 A1 * | 10/2001 | Fong et al. | 714/18 |
| 2001/0050901 A1 * | 12/2001 | Love et al. | 370/235 |

(Continued)

FOREIGN PATENT DOCUMENTS

| | | |
|---|---|---|
| EP | 1161022 | 12/2001 |
| JP | 2001060956 A | 3/2001 |

(Continued)

OTHER PUBLICATIONS

International Search Report—PCT/US06/005795—International Search Authority, European Patent Office, Aug. 31, 2006.

(Continued)

*Primary Examiner* — Charles C Jiang
(74) *Attorney, Agent, or Firm* — Abdollah Katbab

(57) ABSTRACT

Embodiments disclosed herein relate to a new set of radio link protocols (RLPs) configured to provide for efficient data transmission in a multi-link communication system. In an embodiment, an upper-layer packet is segmented into link-layer packets to be transmitted over a plurality of communication links, each including a first sequence number in accordance with a predetermined order. A second sequence number is further added to each link-layer packet to be transmitted for the first time. The second sequence number is configured to be in a sequence space associated with a particular communication link, and may be used for detection of missing packets.

28 Claims, 15 Drawing Sheets

(56) References Cited

U.S. PATENT DOCUMENTS

| | | | |
|---|---|---|---|
| 2002/0172192 A1* | 11/2002 | Hunzinger et al. | 370/352 |
| 2003/0043764 A1* | 3/2003 | Kim et al. | 370/329 |
| 2003/0054807 A1* | 3/2003 | Hsu et al. | 455/414 |
| 2003/0210669 A1* | 11/2003 | Vayanos et al. | 370/335 |
| 2004/0027999 A1* | 2/2004 | Casaccia et al. | 370/312 |
| 2004/0059978 A1 | 3/2004 | Subrahmanya | |
| 2004/0095964 A1* | 5/2004 | Meylan et al. | 370/506 |
| 2005/0002363 A1* | 1/2005 | Cheng et al. | 370/338 |
| 2006/0245428 A1* | 11/2006 | Yanamoto et al. | 370/394 |

FOREIGN PATENT DOCUMENTS

| | | |
|---|---|---|
| JP | 2003163670 A | 6/2003 |
| WO | 0025470 | 5/2000 |
| WO | 0180477 | 10/2001 |

OTHER PUBLICATIONS

International Preliminary Report on Patentability—PCT/US2006/005795, International Search Authority—The International Bureau of WIPO, Geneva, Switzerland—Aug. 21, 2007.

Written Opinion—PCT/US2006/005795, International Search Authority—European Patent Office—Aug. 31, 2006.

Roobol C, et al: "A Proposal for an RLC/MAC Protocol for Wideband CDMA Capable of Handling Real Time and Non-Real Time Services" Vehicular Technology Conference, 1998. VTC 98. 48th IEEE Ottawa, Ont., Canada May 18-21, 1998, New York, NY USA, IEEE, US, vol. 1, pp. 107-111.

European Search Report—EP10011199—Search Authority—Munich—Apr. 8, 2011.

Partial European Search Report—EP10011199, Search Authority—Munich Patent Office, Dec. 11, 2010.

Taiwan Search Report—TW095105535—TIPO—Mar. 19, 2012.

\* cited by examiner

RADIO LINK PROTOCOLS FOR ENHANCING EFFICIENCY OF MULTI-LINK COMMUNICATION SYSTEMS

CLAIM OF PRIORITY UNDER 35 U.S.C. §119

This application for patent claims priority to U.S. Provisional Application No. 60/654,605, "Radio Link Protocols for Multi-Link Communication Systems," filed Feb. 18, 2005; U.S. Provisional Patent Application No. 60/659,642, "Radio Link Protocols for Multi-Link Communication Systems," filed Mar. 7, 2005; and U.S. Provisional Patent Application No. 60/715,730, "Radio Link Protocols for Multi-Link Communication Systems," filed Sep. 8, 2005, all of which are assigned to the assignee hereof and hereby expressly incorporated by reference herein.

BACKGROUND

1. Field

This disclosure relates generally to wireless communication systems. More specifically, embodiments disclosed herein relate to a new set of radio link protocols (RLPs) configured to enhance the efficiency of multi-link communication systems.

2. Background

Wireless communication systems are widely deployed to provide various types of communication (e.g., voice, data, etc.) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards.

In response to the growing demand for multimedia services and high-rate data, multi-link modulation has been proposed in wireless communication systems. There lies a challenge to provide efficient and robust multi-link communication systems.

DETAILED DESCRIPTION

Embodiments disclosed herein relate to providing a new set of radio link protocols (RLPs) and associated procedures configured to enhance the efficiency of multi-link communication systems.

Figure 1:
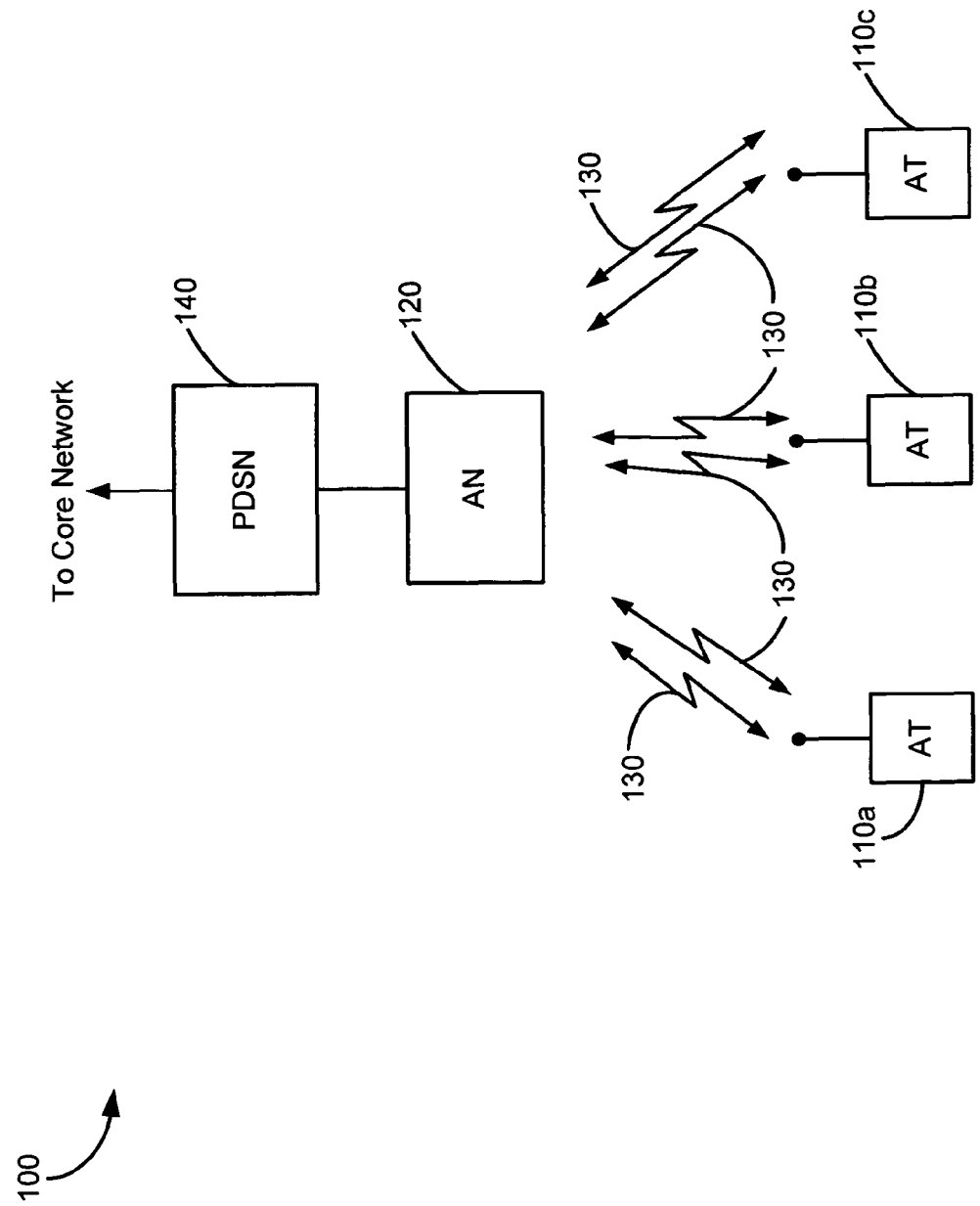
FIG. 1 illustrates an embodiment of a multi-link communication system.

FIG. 1 illustrates an embodiment of a multi-link communication system 100. By way of example, various access terminals (ATs) 110, including ATs 110*a*-110*c*, are dispersed throughout the system. Each AT 110 may communicate with an access network (AN) 120 via one or more channels at different frequencies on a forward link and/or a reverse link at a given moment, as illustrated by double-sided arrows 130. For illustration and clarity, two double-sided arrows 130 are shown for each AT 110. There may be any number of channels (or frequencies) on either forward link or reverse link in a communication system. Further, the number of frequencies on the forward link need not be the same as the number of frequencies on the reverse link.

AN 120 may further be in communication with a core network, such as a packet data network via a packet data serving node (PDSN) 140. In an embodiment, system 100 may be configured to support one or more standards, e.g., IS-95, cdma2000, IS-856, W-CDMA, TD-SCDMA, other multi-link standards, or a combination thereof.

A base-station transceiver system (BTS) disclosed herein may also be referred to as and/or implement functions of an access network transceiver (ANT), an access point (AP), a base station (BS), a modem pool transceiver (MPT), a Node B (e.g., in a W-CDMA type system), etc. A cell may refer to a coverage area serviced by a BTS. A cell may further include one or more sectors. Further, a base station controller (BSC) may refer to the portion of a communication system configured to interface with a core network (e.g., a packet data network) and route data packets between ATs and the core network, perform various radio access and link maintenance functions (such as soft handoff), control radio transmitters and receivers, and so on. A BSC may also be referred to as and/or implement the functions of an access network controller (ANC). A BSC and one or more BTSs may constitute part of an AN.

An AT disclosed herein may refer to various types of devices, including (but not limited to) a wireless phone, a cellular phone, a laptop computer, a multimedia wireless device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, access node, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more BTSs on a forward link and/or a reverse link at a given moment.

A "sender" disclosed herein may be a BTS, an AN, an AT, or any other means configured to transmit data packets via one or more communication links. A "receiver" disclosed herein may be an AT, a BTS, an AN, or any other means configured to receive data packets through one or more communication links. A communication link may include a radio-frequency (RF) carrier, a fiber-optic link, a coaxial cable, other digital communication means, or a combination thereof.

A multi-link communication system disclosed herein may include a frequency division multiplexing system, an orthogonal frequency division multiplexing system, or other multi-link modulation systems, where each link corresponds to a frequency range.

In some single-link communication systems, a sender (e.g., a BTS) segments an upper-layer packet (e.g., an Internet protocol (IP) packet) into a plurality of packets and adds to each packet a sequence number, before transmitting the packets to a receiver (e.g., an AT) via a communication link (e.g., an RF carrier). The receiver uses the sequence numbers of the received packets to re-construct the original upper-layer packet. If the receiver detects a gap (or hole) in the sequence numbers (e.g., the sequence numbers of two consecutively-received packets being noncontiguous), it then sends a negative acknowledgment (NAK) message to the sender, indicating the missing (e.g., erased) packet(s). The sender subsequently re-transmits the missing packet(s).

In a communication system employing multiple communication links (e.g., a plurality of RF carriers and/or other digital communication links), because the packets arrive at the receiver by way of different communication links, the sequence numbers of the received packets may not be contiguous, even in the absence of missing packets. In such situations, the aforementioned packet transmission scheme may cause a large number of NAK messages (e.g., from the receiver) and spurious re-transmitted packets (e.g., from the sender) and, as a result, slow down the data transmission process.

A need, therefore, exists for a new scheme to overcome the aforementioned shortcomings and provide for efficient data transmission in a multi-link communication system.

Embodiments disclosed herein relate to a new set of RLPs configured to provide for efficient data transmission in a multi-link communication system.

In an embodiment, a method for data transmission in multi-link communication system comprises: segmenting an upper-layer packet into link-layer packets to be transmitted over a plurality of communication links; adding a first sequence number to each link-layer packet (e.g., in accordance with a predetermined order); and adding a second sequence number to each link-layer packet to be transmitted for a first time, the second sequence number being in a sequence space associated with a particular communication link. The second sequence number may be used for detection of the missing packets, as further described below.

In an embodiment, a method for data processing in multi-link communication system comprises: examining two link-layer packets received consecutively through a particular communication link, each link-layer packet identified by a first sequence number and a second sequence number, the second sequence number being associated with the particular communication link; and transmitting a message to a sender to request re-transmission of one or more missing link-layer packets, if the second sequence numbers of the two consecutively-received data packets are noncontiguous.

In an embodiment, a multi-link RLP is provided, including a segmentation and reassembly (SAR) part and an automatic repeat request (ARQ) part. The SAR part of RLP may be responsible for segmenting an upper-layer packet (e.g., an IP packet) into pieces, termed "link-layer packets" herein, and add a (first) sequence number, termed "SAR_seq" herein, to each link-layer packet. A receiver may use the SAR_seqs of the received packets to re-construct the upper-layer packet. The ARQ part of RLP may add another (or second) sequence number, termed "ARQ_seq" herein, to each link-layer packet. ARQ_seq may belong to a sequence space that is associated with a particular logical communication link, which allows the receiver to detect the missing packets by identifying any gap(s) in the ARQ_seqs of the packets received through the communication link. The ARQ_seq may be long enough so that it does not wrap-around during a burst of erasures on a communication link, but it need not be so long as to prevent a sequence wrap-around during a re-transmission. In an embodiment, a logical communication link may include forward link pilots that draw packets from the same BTS queue.

Figure 2:
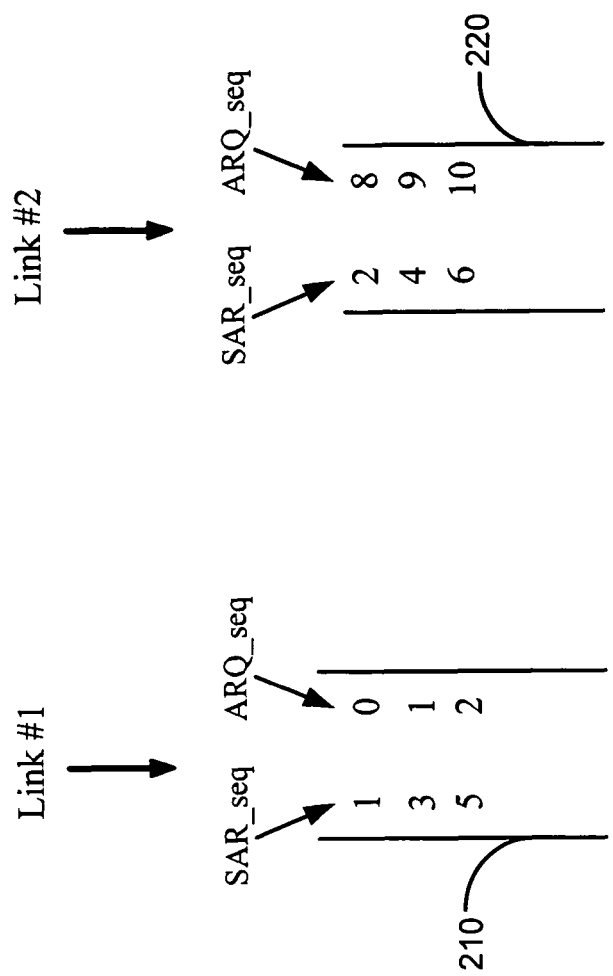
FIG. 2 illustrates an embodiment of packets arriving at a receiver through multiple communication links.

By way of example, FIG. 2 illustrates an embodiment of two "streams" (or "pipes") 210, 220 of packets arriving at a receiver through two communication links, e.g., Link #1 and Link #2. For purposes of illustration, each packet is identified by a pair of sequence numbers: SAR_seq and ARQ_seq. If the receiver detects a gap in the ARQ_seqs of the received packets within each link (e.g., the sequence numbers of two packets received consecutively through the same link are noncontiguous according to a transmission scheme), the receiver may send a message (e.g., an NAK message) to the sender, reporting the missing packet(s). Note, the SAR_seqs within each communication link need not be in order. The receiver may use the SAR_seqs of the received packets (through various links) to re-construct the original upper-layer packet.

Figure 3:
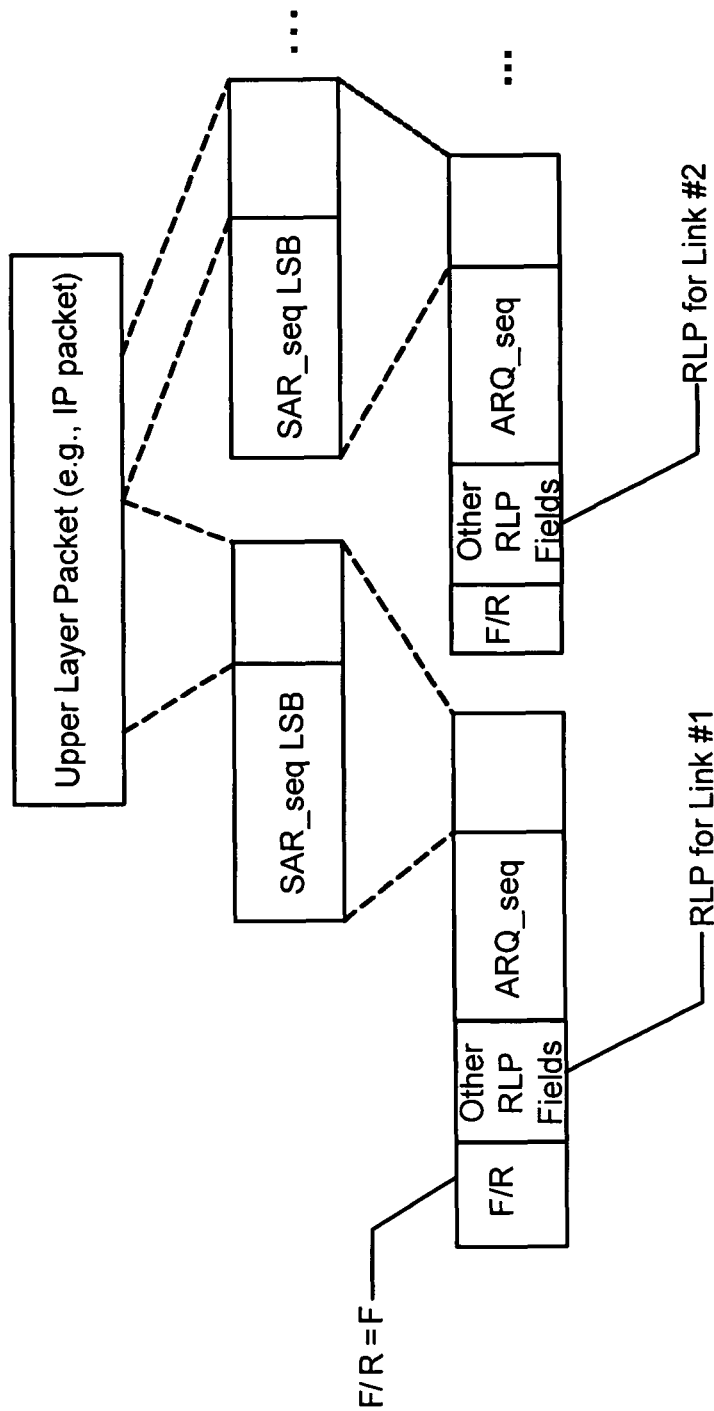
FIG. 3 illustrates an embodiment of packet segmentation for the first-time-transmitted packets.
Figure 4:
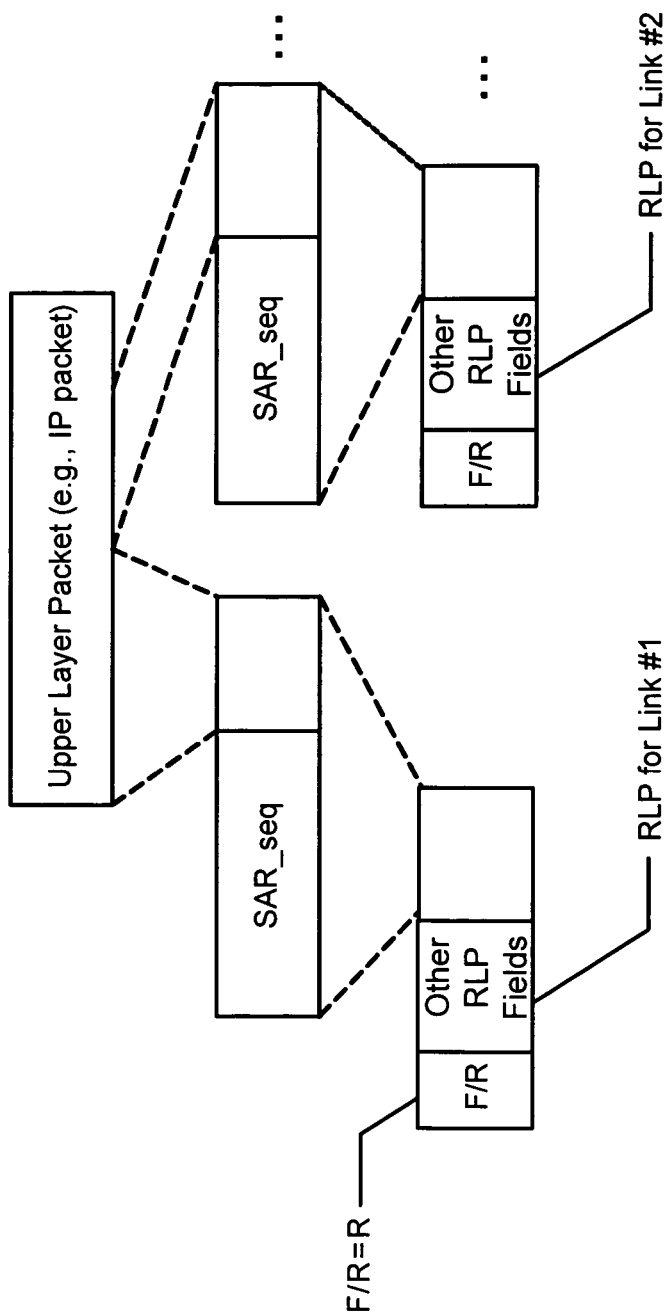
FIG. 4 illustrates an embodiment of packet segmentation for the re-transmitted packets.

FIG. 3 illustrates an embodiment of packet segmentation for the first-time-transmitted packets. An upper-layer (e.g., an IP packet) packet may be segmented into a plurality of link-layer packets. Each link-layer packet may include a first sequence number, e.g., SAR_seq least significant bit(s) (SAR_seq LSB); a second sequence number, e.g., ARQ_seq; other RLP fields associated with a given link; and an F/R flag. The F/R flag may be implemented to indicate whether a packet is a first-time-transmitted one (for which the F/R flag is set to be "F", such as shown in FIG. 3), or a re-transmitted one (for which the F/R flag is set to be "R", such as shown in FIG. 4). Note, in the embodiment shown, the RLP-ARQ does not further segment an RLP-SAR packet, because RLP-ARQ may request RLP-SAR to segment the upper layer packet such that it fits in the physical layer payload.

FIG. 4 illustrates an embodiment of packet segmentation for the re-transmitted packets. In this case, ARQ_seq need not be included in a re-transmitted packet (in light of the packet having already been identified as "missing" by the receiver). The F/R flag is set to "R". Note, the length of the SAR_seq field included in a re-transmitted RLP-SAR packets may be larger than that of a first-time transmitted packet (e.g., SAR_seq vs. SAR_seq LSB). This allows the length of SAR_seq for the first-time-transmitted packets (which constitute the majority of the packets sent) to be small, without causing the re-transmitted RLP-SAR packets to wrap-around. For example, the length of SAR_seq in a first-time-transmitted RLP-SAR packet needs to be only so long that it does not wrap-around during a burst of errors.

In some embodiments, when an RLP packet is re-transmitted using a delayed ARQ, termed "D-ARQ" herein, the format shown in FIG. 4 may be used. Such avoids the possibility of the small ARQ_seq (such as shown in FIG. 3) wrapping-around between the first time the packet is transmitted and the time the D-ARQ'ed packet is sent.

Figure 5:
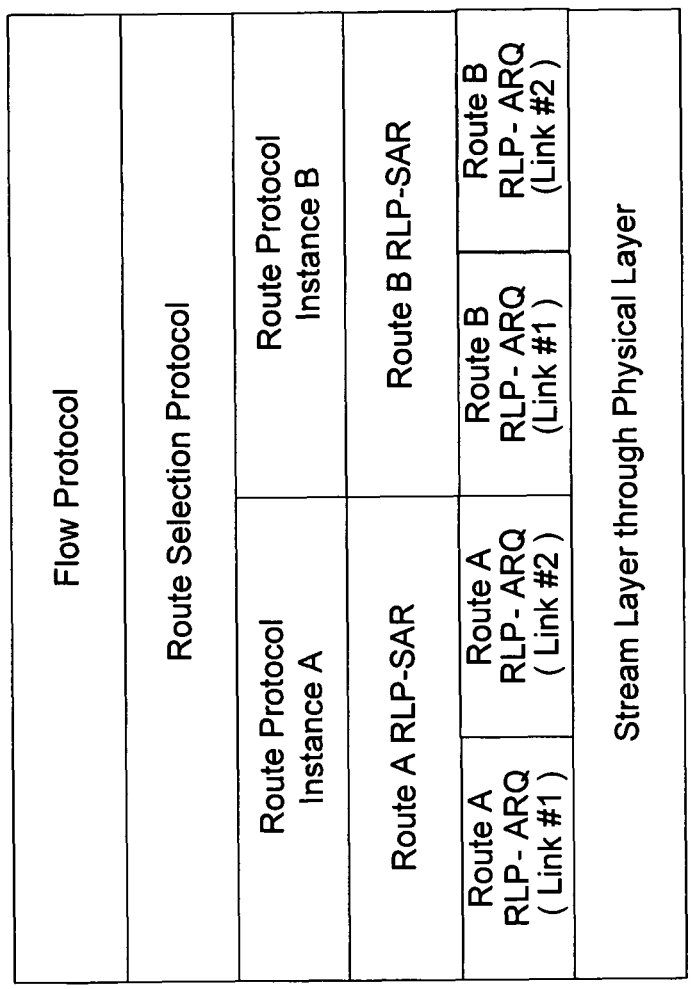
FIG. 5 illustrates an embodiment of a protocol stack for a multi-link communication system.

FIG. 5 illustrates an embodiment of a protocol stack, e.g., displaying the relationship among the upper layer protocol, RLP-SAR and RLP-ARQ instances on each link flow. For illustration and clarity, two communication links are explicitly shown. The embodiment of FIG. 5 may be extended to a system employing more than two communication links.

Figure 6:
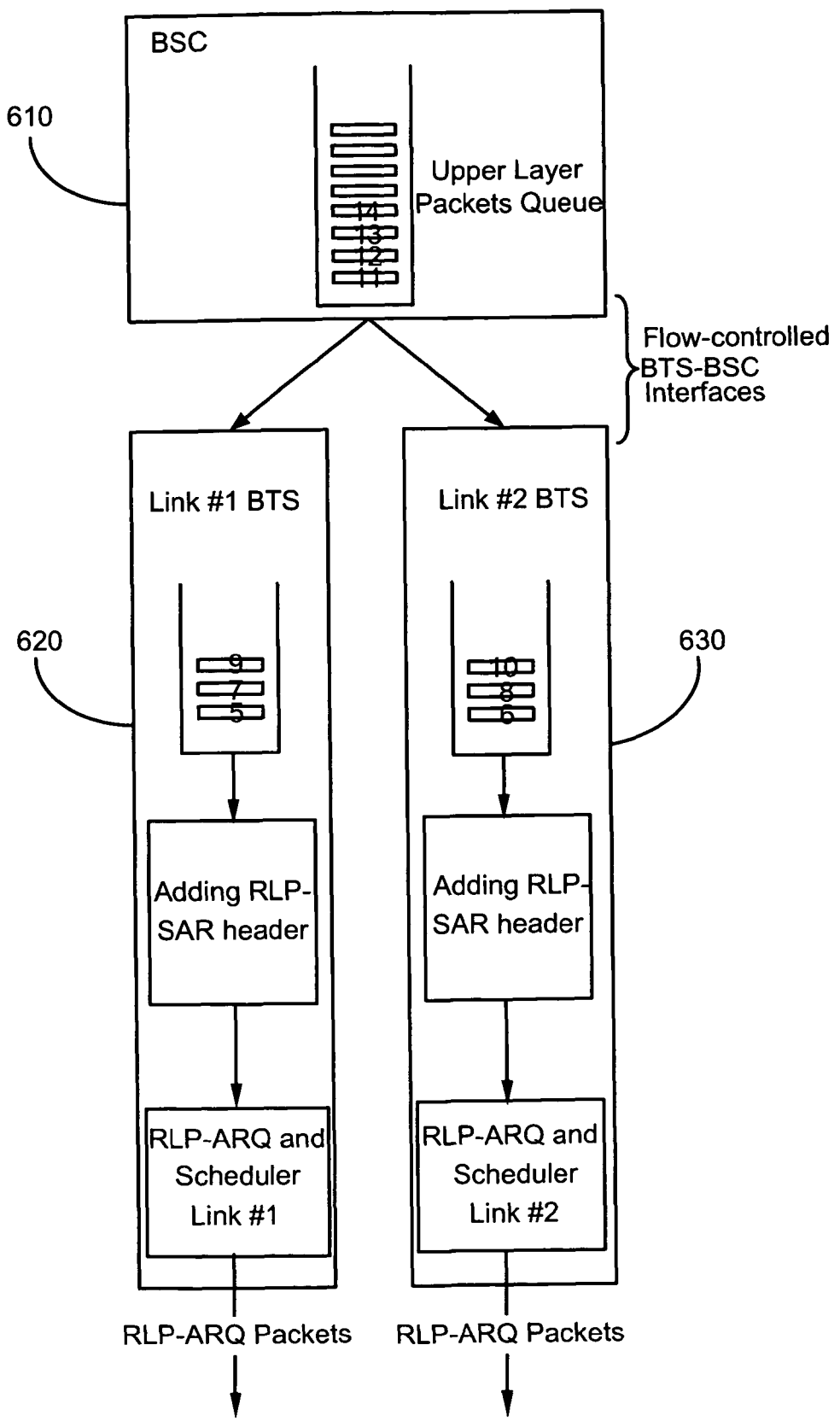
FIG. 6 illustrates an embodiment of an architecture in a multi-link communication system.

FIG. 6 illustrates an embodiment of an architecture in a multi-link communication system, where a BSC 610 is in communication with a serving sector employing two communication links 620, 630. Similar to the single-link case, the RLP headers may be added by the sector to allow for just-in-time packaging of RLP packets.

In the embodiment of FIG. 6, associated with each packet in the BSC queue may be meta-data indicating the SAR_seq associated with the octets in the packet. The flow control between the BTS and BSC may be performed using frame identifiers (or "FrameIDs") that are independent of the SAR_seq space. Thus, the fact that the upper layer packets in each BSC queue may be non-sequential does not impact the BTS-BSC interface. In some embodiments, the BSC may segment the upper layer packets across BTSs associated with different links. The de-framing may be done at the receiver after putting the RLP frames back together in the order of SAR_seq. If framing of upper layer packets is to be done by RLP, then an RLP packet may not contain octets from more than one upper layer packet. If high-level data link control (HDLC) framing is used, then an RLP payload may contain octets from more than one upper layer packet, as long as the octets from the upper layer packets are contiguous.

Figure 7:
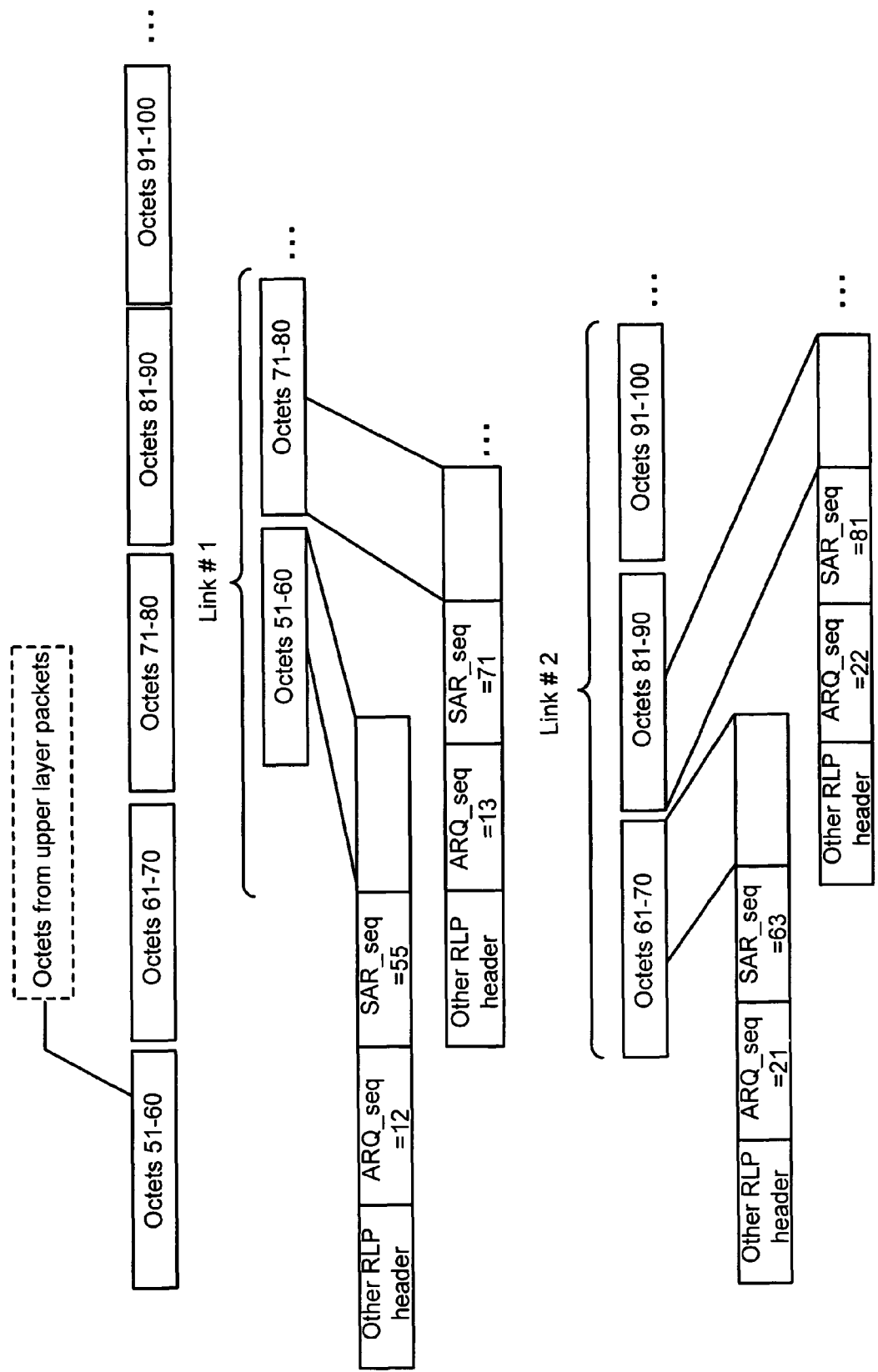
FIG. 7 illustrates an embodiment of how packets are interleaved across multiple communication links.

FIG. 7 illustrates an embodiment of how packets are interleaved across multiple links. For example, the RLP packet with SAR_seq=81 on link #2 may also include octets 91-100.

Figure 8:
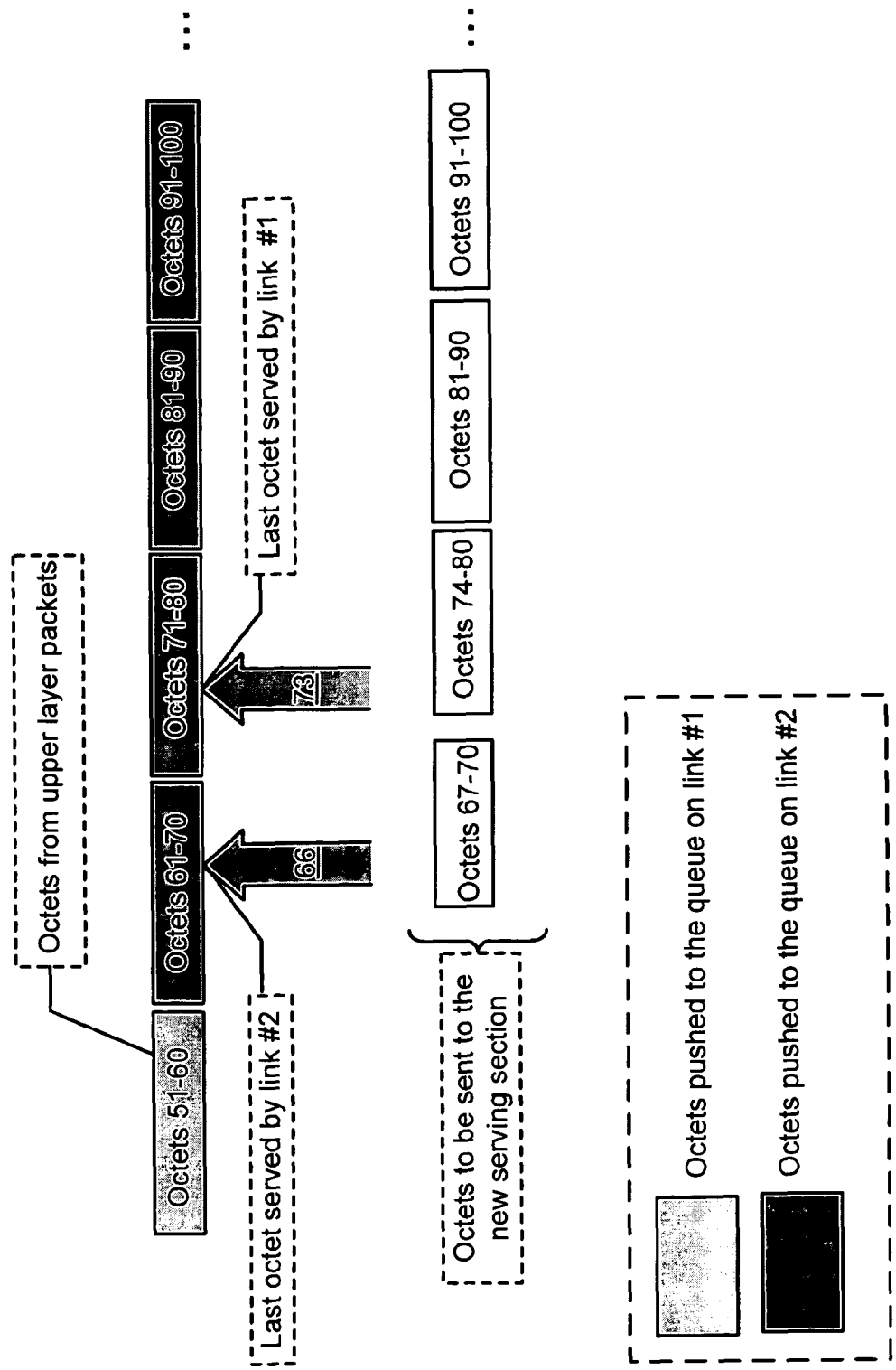
FIG. 8 illustrates an embodiment of packet transmission during serving cell switching.

Upon cell switching, each serving BTS may indicate to the BSC a pair of parameters, e.g., <FrameID, octet_offset>, associated with the last frame it has served. Based on such information, the BSC may determine which octets are yet to be served and send only those octets to the new serving sector. Unlike the single-link case, the octets provided to the new serving sector need not be contiguous, such as illustrated in FIG. 8.

In an embodiment, upon detection of a gap in ARQ_seq on any of the communication links, a receiver may send a status report message, which may include the following: the SAR_seq pairs of the beginning and the end of a SAR sequence gap associated with the communication link where the ARQ_seq gap has been observed. The receiver may alternatively send an NAK message to the sender, which may include such information as the missing SAR_seqs and/or the last SAR_seq received on a communication link.

In an embodiment, the sender may maintain a list of SAR_seqs sent on each communication link. The sender may use this mapping to determine whether a missing SAR packet whose SAR_seq is included in the status report message needs to be re-transmitted or not (in light of that it may still be in-flight). In an embodiment, upon receiving a status report message, the sender may perform the following associated with each reported SAR gap in the status report message: a) determine the communication link with which the SAR gap is associated; b) retransmit the RLP data units that are associated with the SAR gap reported in the status report message and sent on the communication link where the SAR gap is reported.

There may be situations where a receiver (e.g., an AT) is re-pointing (or switching) from one cell to another, while receiving packets on multiple communication links. In an embodiment, the ARQ_seq sequence space may be configured on a per-cell and per-frequency basis. For example, the ARQ_seq may get initialized when a cell is added to the active set. The ARQ_seq may not be initialized upon cell re-pointing. The sectors that are in softer handoff may share the same ARQ_seq space. In some embodiments, a sender (e.g., an AN) may specify the sectors that share the same ARQ_seq space explicitly, e.g., via a message it sends to a receiver (e.g., an AT). Such allows the AT to discover any gaps at the beginning of being served from a sector.

In some embodiments, it may be desirable to be able to detect missing RLP packets at the end of the transmission from a pilot. Consider the following scenarios:

A pilot is deleted from the active set and the last few RLP packets sent from that pilot are missing (e.g., erased). Because the receiver may rely on the reception of the next good RLP packet to detect a gap in ARQ_seq, it may not be able to detect such missing RLP packets, and a status report message may not be triggered.

An AT re-points its data source channel (DSC) from sector A to sector B (sector A and sector B belonging to different cells) and the last few RLP packets from sector A are erased. As a result, the AT may not be able to discover such a gap in the ARQ_seqs of the received RLP packets, and a status report message may not be triggered.

In an embodiment, the method described as follows may be used to detect the erased RLP packets at the end of a transmission from a pilot. Upon DSC re-pointing or removal of a pilot from the active set, an AT sends a message to the AN which may include the last SAR_seq from the pilot(s) that are no longer in the serving sector. (In some situations, to avoid sending too many NAK messages in the event that an AT ping-pongs between two cells, the AT may send this report only if a predetermined period of time (e.g., T ms) has passed and the AT has not pointed its DSC back to the original cell.) In the DSC re-pointing case, the message may include the last SAR_seq from the pilots in the old serving sector. In the case of removal of a pilot from the active set, the message may include the last SAR_seq from the pilot that is deleted from the serving sector. Upon reception of the message from the AT, the AN may determine whether the AT has missed any RLP packets.

There may be situations where a receiver misses RLP packets that are sent by a sender at the end of a burst of data from one of the communication links. To detect such missed packets, in an embodiment a receiver may start a timer (e.g., a "catch-all" timer) when it detects a gap in SAR_seq. The timer may be reset if the gap is filled, or if the receiver sends an NAK message that includes the gap (due to other triggers). When the timer expires, the receiver may send an NAK message for this gap. The NAK message may include the last SAR_seq received from all the serving pilots.

In an embodiment, the following may be applied when sending a status report/NAK message:

If any of the following events occur, a receiver (e.g., an AT) sends a status report/NAK message:
1. The serving cell changes or the serving pilot is removed from the active set, and there is a gap in SAR_seq.
2. The AT detects a gap in ARQ_seq from a cell.

If a predetermined period of time (e.g., T ms) has passed since the time when the AT detected a gap in SAR_seq, an NAK message including the missing SAR_seqs has not been sent.

In the case of removal of a pilot from the active set, the status report message from the AT may include the last SAR_seq from the pilot that is deleted from the serving sector.

In the DSC re-pointing case, the status report message from the AT may include the last SAR_seq from the pilots in the old serving sector.

The status report message may include the last SAR_seq from all the communication links in the serving sector.

Upon reception of a status report message from the AT, the AN may determine whether the AT has missed any RLP packets.

Upon reception of an NAK message from the AT, the AN may transmit the SAR_seq octets in the NAK message that have not been re-transmitted.

There may also be situations where a receiver misses RLP packets that are sent by the sender at the end of a burst of data (not just from one of the communication links). In an embodiment, the following may be used to detect such missed packets:

After sending an RLP packet to the sectors, the BSC may start a timer (or "flush timer").

The timer may reset whenever the BSC sends a new RLP packet to any of the sectors.

When the timer expires, the BSC may send a flush message.
  1. The message may indicate to a receiver (e.g., an AT) that this is the end of the burst of data.
  2. This message may include the last RLP packet.

Upon reception of the flush message, if the AT detects that there is a gap in SAR_seq that has not been reported previously, the AT sends an NAK message.

Examples described below further illustrate various embodiments disclosed herein.

In an example of removing a pilot from the serving sector, consider a scenario where the pilot belonging to link #2 is removed from the serving sector after it has served packet <3, 10>.

| Link # 1 | Link #2 (being removed) |
|---|---|
| <ARQ_seq, SAR_seq> | <ARQ_seq, SAR_seq> |
| <1, 5> | |
| <2, 7> | <1, 6> |
| <3, 9> | <2, 8> Erased |
|  | <3, 10> Erased |

Upon reception of a traffic channel assignment message that removes the pilot from the active set, an AT may send a message to an AN including the following information:

AT Status_Report_Message{pilot x link_2: last_SAR_seq=6}

The AN subsequently re-sends the packets with SAR_seq=8, 10 respectively on any of the remaining pilots in the serving sector.

In an example of cell switching, consider a scenario where the serving cell changes and the following packets are served from the old serving cell:

| Link # 1 | Link #2 |
|---|---|
| <ARQ_seq, SAR_seq> | <ARQ_seq, SAR_seq> |
| <1, 5> | |
| <2, 7> | <1, 6> |
| <3, 9> Erased | <2, 8> Erased |
|  | <3, 10> Erased |

Upon switching, the AT may send a message to the AN including the following information:

AT Status_Report_Message { pilot x link_2: last_SAR_seq = 6
                         pilot y link_1: last_SAR_seq = 7 }

The AN subsequently re-sends the packets with SAR_seq=8, 9, 10 respectively on any of the pilots in the serving sector.

The following illustrates a segment-based SAR_seq example:

| Link # 1 | Link #2 |
|---|---|
| <ARQ_seq, SAR_seq> | <ARQ_seq, SAR_seq> |
| <1, 5> | |
| <2, 7> Erased | <1, 6> |
| <3, 9> | <2, 8> Erased |
|  | <3, 10> |

When packet <3, 9> is received on link #1, a receiver may send:

Status_Report_message {SAR_missing_boundary=5, 9}

When the sender receives the above status report message, it may re-transmit only the packet with SAR_seq=7, because the status report message indicates to the sender that a) an erasure on link #1 (where packets with SAR_seq=5, 9 have been sent) has occurred and b) RLP data units that are sent on link #1 and with SAR_seq between 5 and 9 are missing. When the sender re-transmits the packet with SAR_seq=7, it may send it on link #1 or link #2. The re-transmitted packet with SAR_seq=7 may be sent without ARQ_seq.

When packet <3,10> is received on link #2, the receiver may send (assuming that re-transmitted packet with SAR_seq=7 is yet to be received):

Status_Report_message {SAR_missing_boundary=6, 10}

When the sender receives the above status report message, it may re-transmit the packet with SAR_seq=8.

Figure 9:
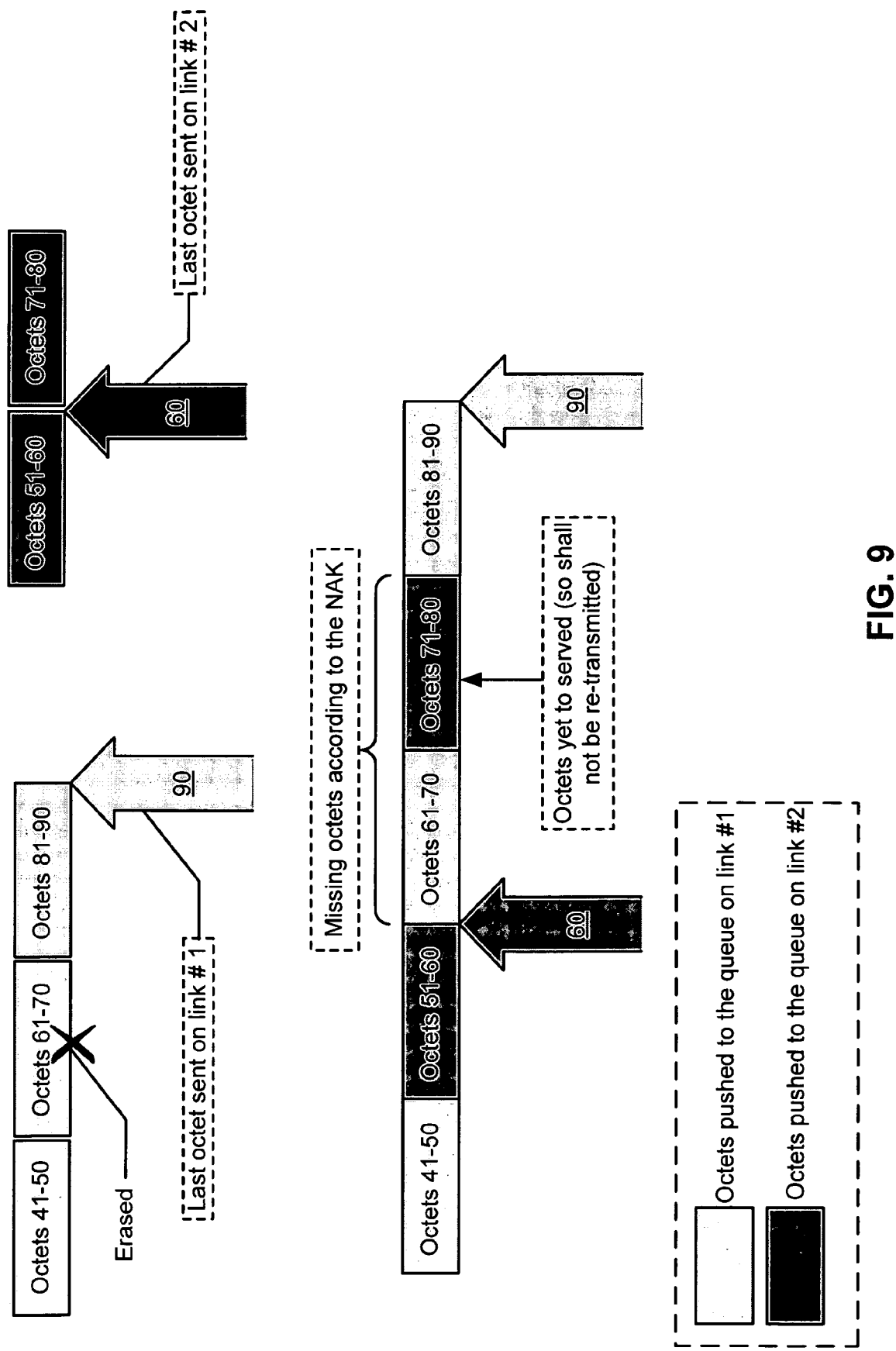
FIG. 9 illustrates an example of octet-based segmentation and reassembly sequence number (SAR_seq)

FIG. 9 illustrates an example of octet-based SAR_seq, which is similar to the segment-based example illustrated above with the difference that the SAR_seq is an octet-based sequence number. In this case, a receiver may send a status report message after reception of the RLP packet containing "Octets 81-90". The status report is generated because the receiver detects a gap in ARQ_seq on link #1. The status report message may indicate:

missing_interval: octets with SAR_seq=51 through 80 are missing on link #1.

The sender may perform the following after reception of the status report message:

For each missing_interval reported, the sender determines the communication link on which the RLP data units have been transmitted, and re-transmits the missing data units reported by the receiver that belong to the missing_interval and have been sent on that link. When re-transmitting, it may not matter which communication link in the serving sector is selected to send the missing octets.

Figure 10:
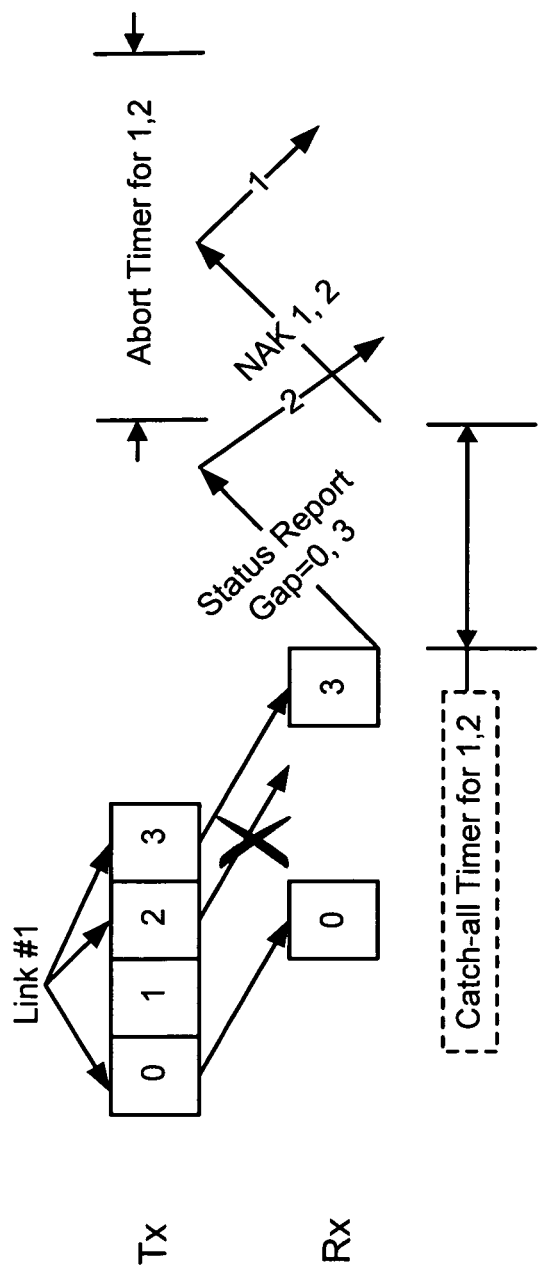
FIG. 10 illustrates a scenario in a multi-link communication system.

FIG. 10 illustrates an example in which a receiver sends a status report message as a result of detecting a gap in ARQ_seq. In this case, the communication link (e.g., Link #1) on which packet "1" is to be sent may be clogged and thus unavailable; packet "2" may be erased during transmission. After the "catch-all" timer expires, the receiver sends a status report message requesting re-transmission of packets that are sent on Link #1 and with SAR_seq between 0 and 2.

Figure 11:
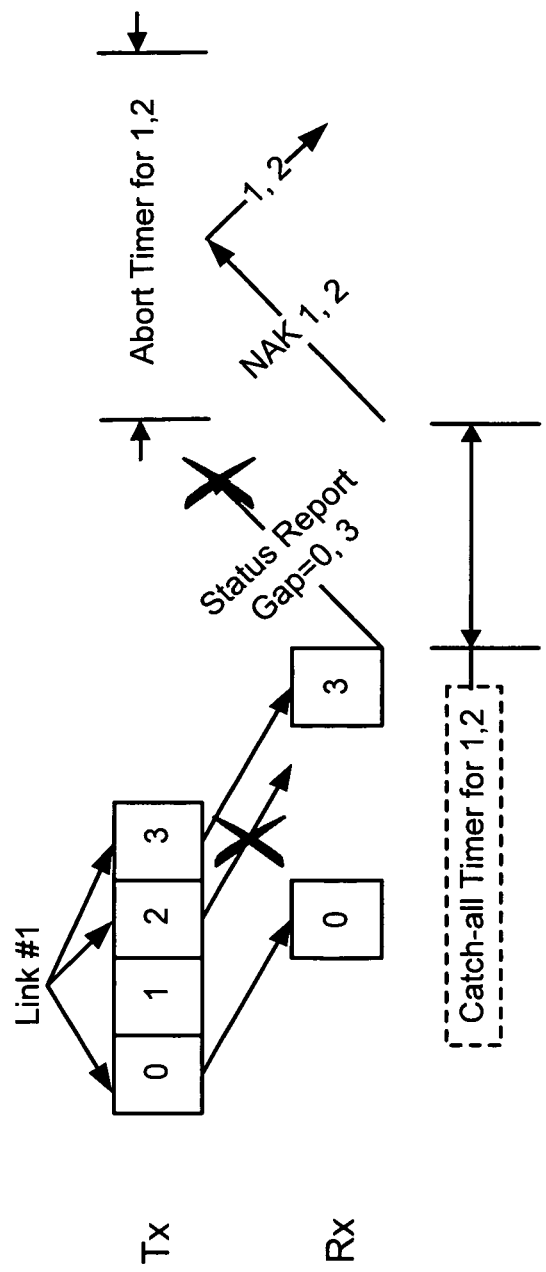
FIG. 11 illustrates another scenario in a multi-link communication system.

FIG. 11 illustrates an example similar to the one shown in FIG. 10, with the difference that the status report message is erased. As a result, the sender re-sends both packets "1" and "2" upon reception of the NAK message.

Figure 12:
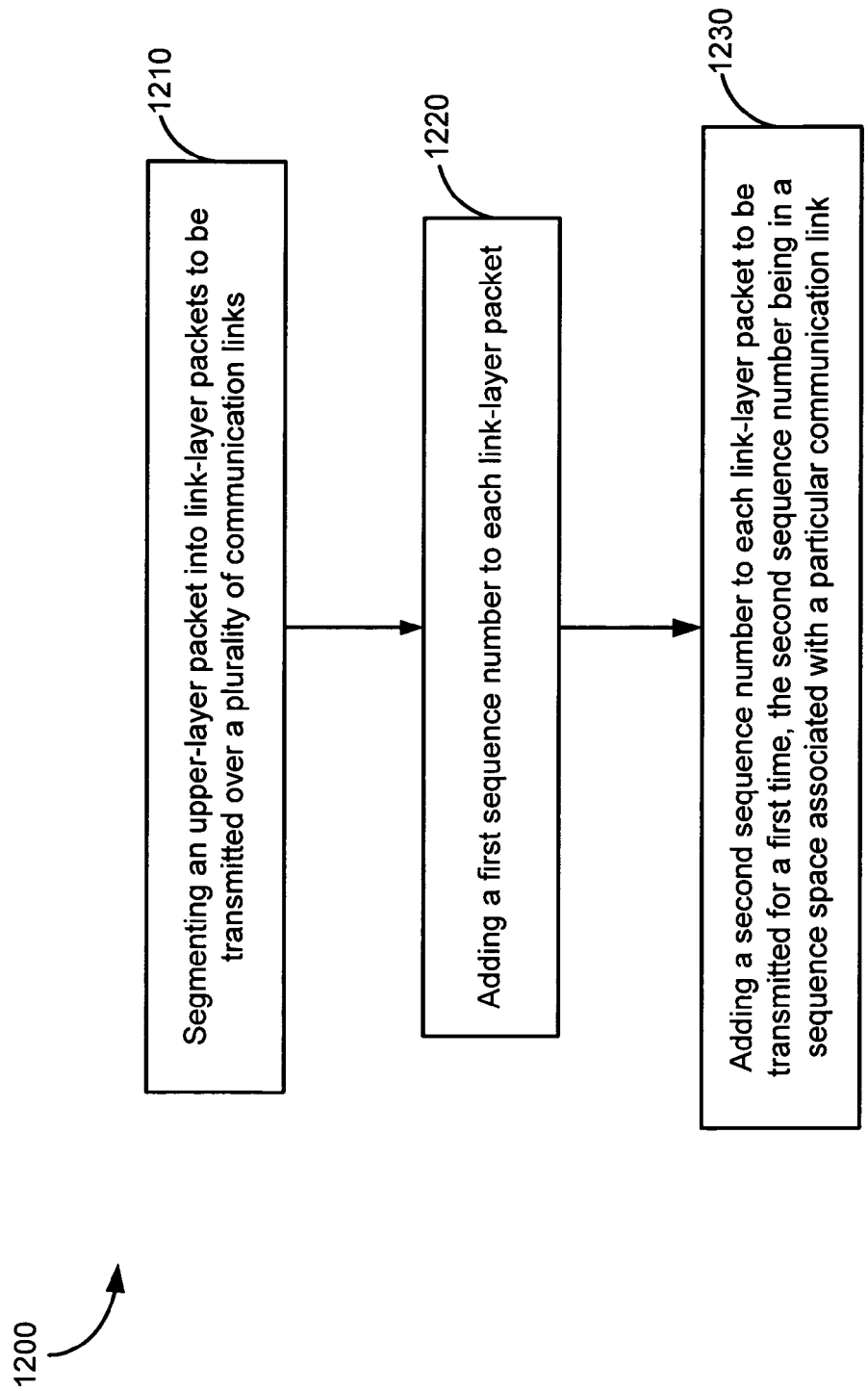
FIG. 12 illustrates a flowchart of a process, which may be used in an embodiment to implement data transmission in a multi-link communication system.

FIG. 12 illustrates a flowchart of a process 1200, which may be used in an embodiment to implement data transmission in a multi-link communication system. Step 1210 segments an upper-layer packet into link-layer packets to be transmitted over a plurality of communication links. Step 1220 adds a first sequence number (e.g., SAR_seq LSB or SAR_seq) to each link-layer packet. Step 1230 adds a second sequence number (e.g., ARQ_seq) to each link-layer packet to be transmitted for a first time, the second sequence number being in a sequence space associated with a particular communication link.

Figure 13:
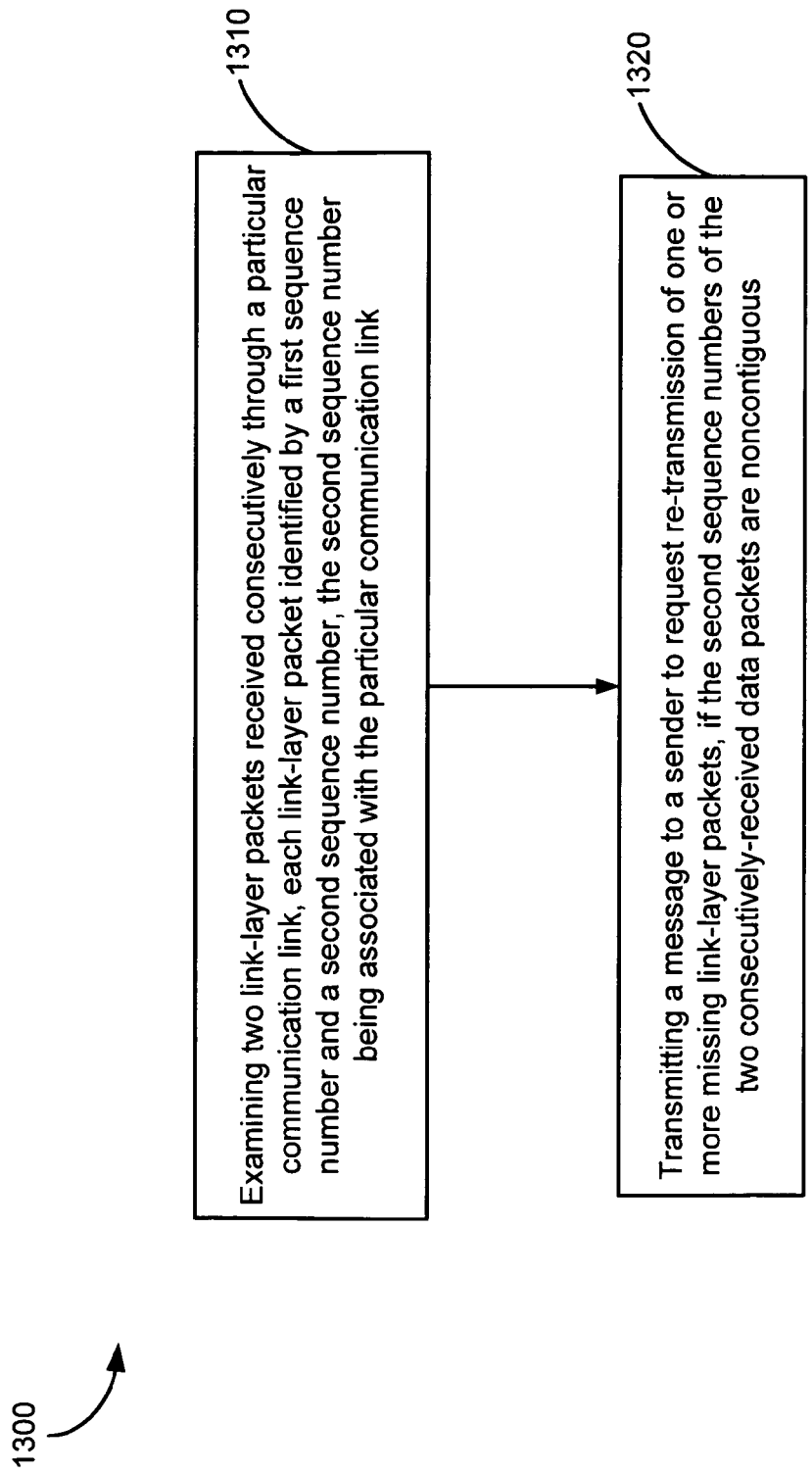
FIG. 13 illustrates a flowchart of a process, which may be used in an embodiment to implement data processing in a multi-link communication system.

FIG. 13 illustrates a flowchart of a process 1300, which may be used in an embodiment to implement data processing in a multi-link communication system. Step 1310 examines two link-layer packets received consecutively through a particular communication link, each link-layer packet identified by a first sequence number and a second sequence number, the second sequence number being associated with the particular communication link. Step 1320 transmits a message to a sender to request re-transmission of one or more missing link-layer packets, if the second sequence numbers of the two consecutively-received data packets are noncontiguous.

Figure 14:
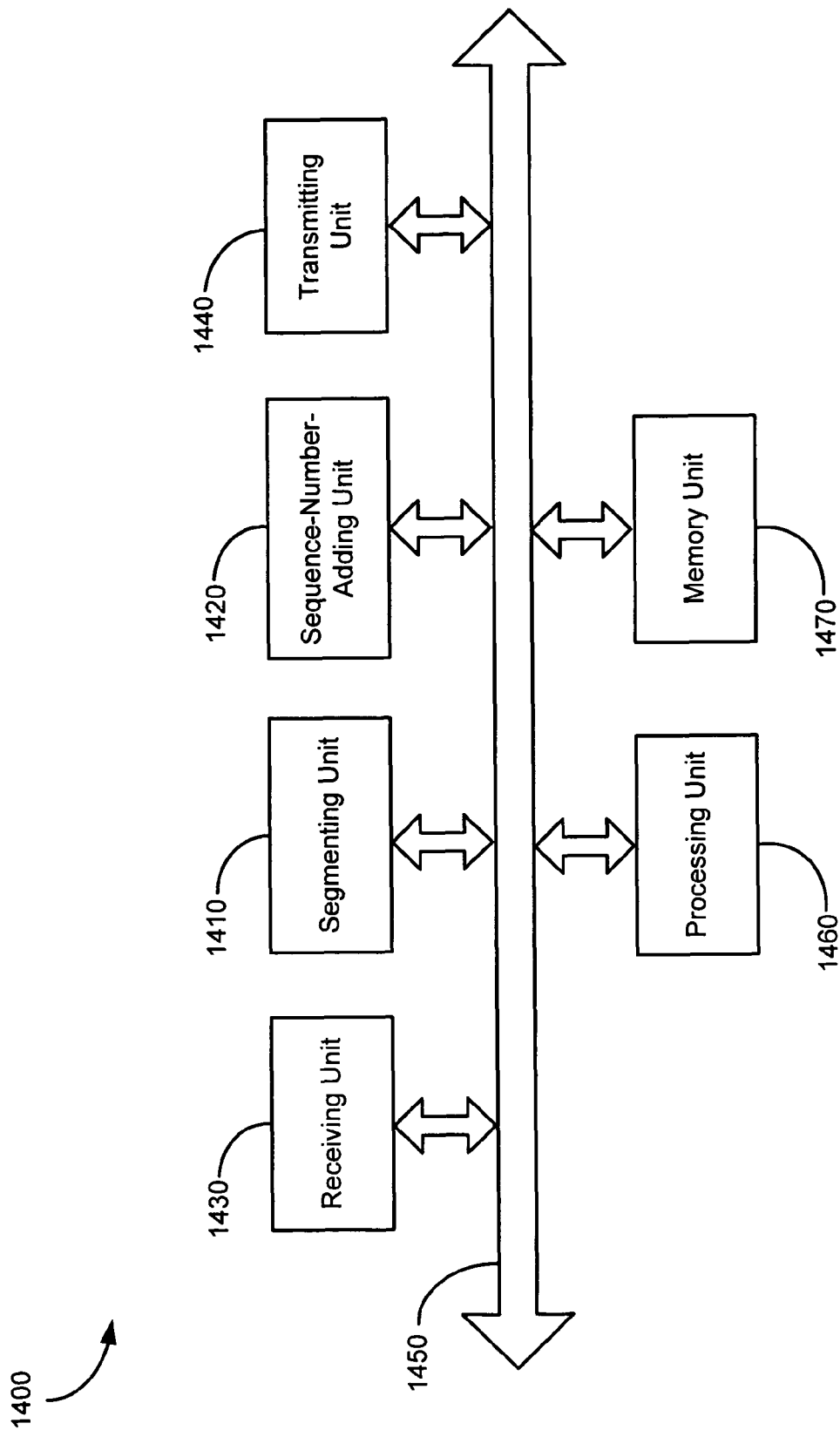
FIG. 14 illustrates a block diagram of an apparatus, in which some disclosed embodiments may be implemented.

FIG. 14 illustrates a block diagram of an apparatus 1400, which may be used to implement some disclosed embodiments (such as described above). By way of example, apparatus 1400 may include a segmenting unit (or module) 1410 configured to segment an upper-layer packet into link-layer packets to be transmitted over a plurality of communication links; and a sequence-number-adding unit 1420 configured to add a first sequence number to each link-layer packet (such as described above). Sequence-number-adding unit 1420 may also be configured to add a second sequence number to each link-layer packet to be transmitted for the first time (such as described above). Apparatus 1400 may further include a receiving unit 1430 configured to receive a message (such as a status report or NAK message described above) from a receiver, e.g., reporting one or more missing packets; and a transmitting unit 1440 configured to transmit data packets to the receiver.

In apparatus 1400, segmenting unit 1410, sequence-number-adding unit 1420, receiving unit 1430, and transmitting unit 1440 may be coupled to a communication bus 1450. A processing unit 1460 and a memory unit 1470 may also be coupled to communication bus 1450. Processing unit 1460 may be configured to control and/or coordinate the operations of various units. Memory unit 1470 may embody instructions to be executed by processing unit 1460.

Figure 15:
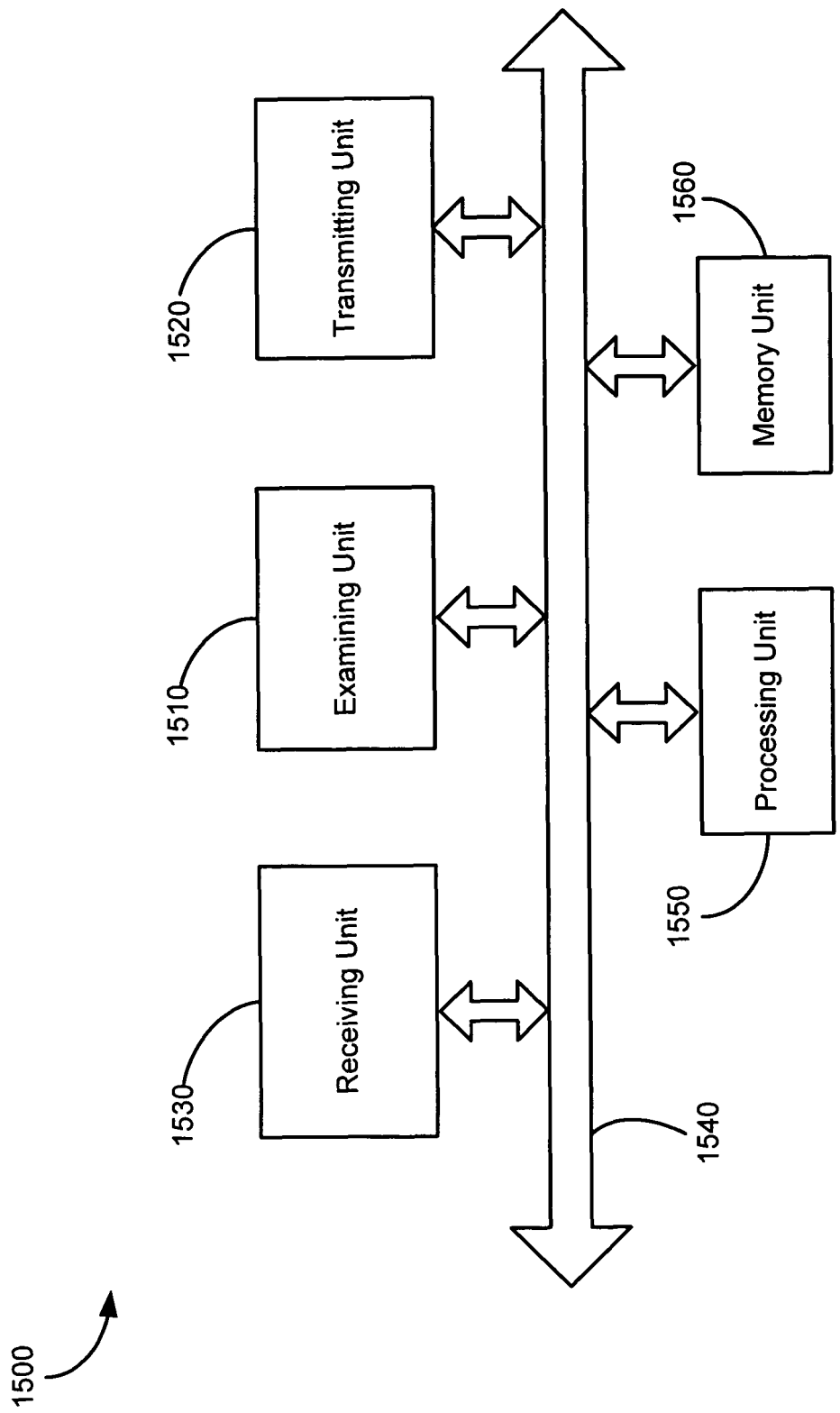
FIG. 15 illustrates a block diagram of an apparatus, in which some disclosed embodiments may be implemented.

FIG. 15 illustrates a block diagram of an apparatus 1500, which may be used to implement some disclosed embodiments (such as described above). By way of example, apparatus 1500 may include an examining unit (or module) 1510 configured to examining two link-layer packets received consecutively through a particular communication link, each link-layer packet identified by a first sequence number and a second sequence number; and a transmitting unit 1520 configured to transmit a message to a sender, e.g., if the second sequence numbers of the two consecutively-received data packets are noncontiguous, or upon detection of other missing packets (such as described above). Apparatus 1500 may further includes a receiving unit 1530, e.g., configured to receiving data packets and messages from the sender.

In apparatus 1500, examining unit 1510, transmitting unit 1520, and receiving unit 1530 may be coupled to a communication bus 1540. A processing unit 1550 and a memory unit 1560 may also be coupled to communication bus 1540. Processing unit 1550 may be configured to control and/or coordinate the operations of various units. Memory unit 1560 may embody instructions to be executed by processing unit 1550. (In some embodiments, memory unit 1560 may also store an AT's active set, such as described above.)

Various units/modules in FIGS. 14-15 and other embodiments may be implemented in hardware, software, firmware, or a combination thereof. Various units/modules described herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Embodiments disclosed herein provide some embodiments of RLPs and implementations thereof for multi-link communication systems. There are other embodiments and implementations. Various disclosed embodiments may be implemented in a BTS, a BSC, an AT, and other senders and receivers configured for communication systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for data processing in a multi-link communication system, comprising:
    receiving link-layer packets corresponding to an upper-layer packet through different communication links, wherein each link-layer packet comprises a plurality of sequence numbers;
    receiving a flush message from a sender, the flush message indicating an end of a burst of data and including a last link-layer packet transmitted;
    determining, upon reception of the flush message, whether there is a gap in one of the plurality of sequence numbers of the received link-layer packets that has not been reported previously; and
    sending a message to the sender, if at least one gap in one of the plurality of sequence numbers of the received link-layer packets is detected.

2. The method of claim 1, wherein the plurality of sequence numbers comprise a segmentation and reassembly sequence number and an automatic repeat request sequence number.

3. An apparatus for data processing in a multi-link communication system, comprising:
    at least one processor and a memory including instructions which when executed by the processor are operative to:
        receive link-layer packets corresponding to an upper-layer packet through different communication links, wherein each link-layer packet comprises a plurality of sequence numbers;
        receive a flush message from a sender, the flush message indicating an end of a burst of data and including a last link-layer packet transmitted;
        determine, upon reception of the flush message, whether there is a gap in one of the plurality of sequence numbers of the received link-layer packets that has not been reported previously; and
        send a message to the sender, if at least one gap in one of the plurality of sequence numbers of the received link-layer packets is detected.

4. The apparatus of claim 3, wherein the plurality of sequence numbers comprise a segmentation and reassembly sequence number and an automatic repeat request sequence number.

5. A non-transitory computer-readable medium embodying instructions executable by a processor to:
    receive link-layer packets corresponding to an upper-layer packet through different communication links, wherein each link-layer packet comprises a plurality of sequence numbers;
    receive a flush message from a sender, the flush message indicating an end of a burst of data and including a last link-layer packet transmitted;
    determine, upon reception of the flush message, whether there is a gap in one of the plurality of sequence numbers of the received link-layer packets that has not been reported previously; and
    send a message to the sender, if at least one gap in one of the plurality of sequence numbers of the received link-layer packets is detected.

6. The computer-readable medium of claim 5, wherein the plurality of sequence numbers comprise a segmentation and reassembly sequence number and an automatic repeat request sequence number.

7. A method for data transmission in a multi-link communication system, comprising:
    segmenting, by an apparatus configured for data transmission in a multi-link communication system, an upper-layer packet into link-layer packets to be transmitted to a receiver over a plurality of different communication links;
    adding, by the apparatus, a first sequence number to each link-layer packet; and
    adding, by the apparatus, a second sequence number to each link-layer packet to be transmitted for a first time, the second sequence number being in a sequence space associated with a particular communication link, wherein contiguous second sequence numbers are added to consecutive link-layer packets that are sent over a same communication link, and wherein the second sequence number is not added to link-layer packets that are being retransmitted;
    wherein the first sequence number belongs to a first sequence and the second sequence number belongs to a second sequence, wherein the first sequence and the second sequence both comprise at least two numbers that are different from one another, wherein different numbers from the first sequence are added to different link-layer packets, and wherein different numbers from the second sequence are added to different link-layer packets to be transmitted for the first time.

8. The method of claim 7, wherein the first sequence number comprises least significant bits of a segmentation and reassembly sequence number (SAR_seq LSB) and the second sequence number comprises an automatic repeat request sequence number (ARQ_seq), for each link-layer packet to be transmitted for a first time.

9. The method of claim 7, wherein the first sequence number comprises a segmentation and reassembly sequence number (SAR_seq), for each link-layer packet to be re-transmitted.

10. The method of claim 7, further comprising adding a status flag to each link-layer packet, the status flag indicating whether each link-layer packet is a first-time transmitted packet or a re-transmitted packet.

11. The method of claim 7, further comprising receiving a message from a receiver, the message including a first-sequence-number gap indicated by the first sequence numbers of two consecutively-received link-layer packets having non-contiguous second sequence numbers.

12. The method of claim 11, further comprising determining a communication link with which the first-sequence-number gap is associated.

13. The method of claim 12, further comprising re-transmitting one or more link-layer packet having first sequence numbers filling in the first-sequence-number gap and transmitted on the determined communication link.

14. A non-transitory computer readable medium embodying instructions executable by a processor to:
segment an upper-layer packet into link-layer packets to be transmitted to a receiver over a plurality of different communication links;
add a first sequence number to each link-layer packet; and
add a second sequence number to each link-layer packet to be transmitted for a first time, the second sequence number being in a sequence space associated with a particular communication link, wherein contiguous second sequence numbers are added to consecutive link-layer packets that are sent over a same communication link, and wherein the second sequence number is not added to link-layer packets that are being retransmitted;
wherein the first sequence number belongs to a first sequence and the second sequence number belongs to a second sequence, wherein the first sequence and the second sequence both comprise at least two numbers that are different from one another, wherein different numbers from the first sequence are added to different link-layer packets, and wherein different numbers from the second sequence are added to different link-layer packets to be transmitted for the first time.

15. An apparatus configured for data transmission in a multi-link communication system, comprising:
at least one processor and a memory including instructions which when executed by the processor are operative to:
segment an upper-layer packet into link-layer packets to be transmitted to a receiver over a plurality of different communication links;
add a first sequence number to each link-layer packet; and
add a second sequence number to each link-layer packet to be transmitted for a first time, the second sequence number being in a sequence space associated with a particular communication link, wherein contiguous second sequence numbers are added to consecutive link-layer packets that are sent over a same communication link, and wherein the second sequence number is not added to link-layer packets that are being retransmitted;
wherein the first sequence number belongs to a first sequence and the second sequence number belongs to a second sequence, wherein the first sequence and the second sequence both comprise at least two numbers that are different from one another, wherein different numbers from the first sequence are added to different link-layer packets, and wherein different numbers from the second sequence are added to different link-layer packets to be transmitted for the first time.

16. A method for data processing in a multi-link communication system, comprising:
examining, by an apparatus configured for data processing in a multi-link communication system, link-layer packets received from a transmitter through different communication links, each link-layer packet comprising a first sequence number and a second sequence number, the second sequence number for a particular link-layer packet being associated with a communication link through which the link-layer packet was received; and
transmitting, by the apparatus, a first message to the transmitter to request re-transmission of one or more missing link-layer packets, if the second sequence numbers of two data packets that are received consecutively through the same communication link are noncontiguous;
wherein the first sequence number belongs to a first sequence and the second sequence number belongs to a second sequence, wherein the first sequence and the second sequence both comprise at least two numbers that are different from one another, and wherein the two link-layer packets comprise different numbers from the first sequence and different numbers from the second sequence.

17. The method of claim 16, wherein the first sequence number comprises least significant bits of a segmentation and reassembly sequence number (SAR_seq LSB) and the second sequence number comprises an automatic repeat request sequence number (ARQ_seq).

18. The method of claim 16, wherein the first message includes the first sequence numbers of the two consecutively-received data packets.

19. The method of claim 16, further comprising:
receiving an indication of removal of a pilot from an active set; and
transmitting a second message to the sender, the second message including the first sequence number of a last link-layer packet received from the pilot before being removed from the active set.

20. The method of claim 19, wherein the second message is transmitted upon a lapse of a predetermined period of time after receiving the indication.

21. The method of claim 16, further comprising:
switching a serving cell from a first cell to a second cell; and
transmitting a second message to the sender, the second message including the first sequence number of a last link-layer packer received from each pilot associated with the first cell.

22. The method of claim 21, wherein the second message is transmitted upon a lapse of a predetermined period of time after receiving an indication of removal of a pilot from an active set.

23. A non-transitory computer readable medium embodying instructions executable by a processor to:
examine link-layer packets received from a transmitter through different communication links, each link-layer packet comprising a first sequence number and a second sequence number, the second sequence number for a particular link-layer packet being associated with a communication link through which the link-layer packet was received; and
transmit a message to the transmitter to request re-transmission of one or more missing link-layer packets, if the second sequence numbers of two data packets that are received consecutively through the same communication link are noncontiguous;

wherein the first sequence number belongs to a first sequence and the second sequence number belongs to a second sequence, wherein the first sequence and the second sequence both comprise at least two numbers that are different from one another, and wherein the two link-layer packets comprise different numbers from the first sequence and different numbers from the second sequence.

24. An apparatus configured for data processing in a multi-link communication system, comprising:

at least one processor and a memory including instructions which when executed by the processor are operative to:

examine link-layer packets received from a transmitter through different communication links, each link-layer packet comprising a first sequence number and a second sequence number, the second sequence number for a particular link-layer packet being associated with a communication link through which the link-layer packet was received; and transmit a first message to the transmitter to request re-transmission of one or more missing link-layer packets, if the second sequence numbers of two data packets that are received consecutively through the same communication link are noncontiguous;

wherein the first sequence number belongs to a first sequence and the second sequence number belongs to a second sequence, wherein the first sequence and the second sequence both comprise at least two numbers that are different from one another, and wherein the two link-layer packets comprise different numbers from the first sequence and different numbers from the second sequence.

25. A method for data processing in a multi-link communication system, comprising:

receiving link-layer packets corresponding to an upper layer packet from a transmitter through different communication links, wherein each link-layer packet comprises a plurality of sequence numbers;

starting a timer upon detecting a gap in sequence numbers of the link-layer packets that are received through a same communication link; and transmitting a message to the transmitter upon expiration of the timer, the message including the gap and the sequence number of a last data packet received from each serving pilot.

26. The method of claim 25, further comprising resetting the timer, upon receiving one or more data packets having sequence numbers filling in the gap.

27. The method of claim 25, further comprising resetting the timer, upon transmitting the message to the sender.

28. The method of claim 25, wherein the plurality of sequence numbers comprise a segmentation and reassembly sequence number and an automatic repeat request sequence number.

* * * * *